United States Patent
Kwong et al.

(10) Patent No.: US 9,559,827 B2
(45) Date of Patent: Jan. 31, 2017

(54) METHODS AND ARRANGEMENTS FOR MANAGING REPORTING OF CHANNEL QUALITY

(71) Applicant: TELEFONAKTIEBOLAGET L M ERICSSON (PUBL), Stockholm (SE)

(72) Inventors: Waikwok Kwong, Solna (SE); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 14/239,600

(22) PCT Filed: Dec. 23, 2013

(86) PCT No.: PCT/SE2013/051620
§ 371 (c)(1),
(2) Date: Feb. 19, 2014

(87) PCT Pub. No.: WO2014/112923
PCT Pub. Date: Jul. 24, 2014

(65) Prior Publication Data
US 2015/0295693 A1 Oct. 15, 2015

Related U.S. Application Data

(60) Provisional application No. 61/754,034, filed on Jan. 18, 2013.

(51) Int. Cl.
*H04L 5/00* (2006.01)
*H04W 24/10* (2009.01)
(Continued)

(52) U.S. Cl.
CPC ............. *H04L 5/0057* (2013.01); *H04B 17/24* (2015.01); *H04W 24/10* (2013.01); *H04W 52/0229* (2013.01); *H04W 52/365* (2013.01)

(58) Field of Classification Search
None
See application file for complete search history.

(56) References Cited

U.S. PATENT DOCUMENTS 8,068,427 B2 * 11/2011 Gholmieh ............. H04L 1/0026
370/231
8,649,263 B2 * 2/2014 DiGirolamo ......... H04L 1/0026
370/229

(Continued)

OTHER PUBLICATIONS

International Search Report & Written Opinion Issued in Appln No. PCT/SE2013/051620, dated May 12, 2014, 12 pages.

(Continued)

*Primary Examiner* — Hong Cho
(74) *Attorney, Agent, or Firm* — Rothwell, Figg, Ernst & Manbeck, P.C.

(57) ABSTRACT

A wireless device (105) for managing reporting of channel quality is configured to communicate with a mobile radio communication network (102). The wireless device (105) identifies (404) there being no downlink activity between the wireless device (105) and the mobile radio communication network (102). The wireless device (105) reduces (406), in response to the identification, a level of channel quality reporting when there is no downlink activity. In a multi Radio Access Bearer (RAB) scenario this supports reduction of a higher drop rate of multi-RAB, e.g. speech and data, compared to e.g. stand-alone speech RAB.

26 Claims, 9 Drawing Sheets

(51) Int. Cl.
*H04W 52/02* (2009.01)
*H04W 52/36* (2009.01)
*H04B 17/24* (2015.01)

(56) References Cited

U.S. PATENT DOCUMENTS

| | | | | |
|---|---|---|---|---|
| 2007/0030828 | A1* | 2/2007 | Vimpari | H04W 72/1284 370/335 |
| 2007/0047502 | A1* | 3/2007 | Marinier | H04L 1/0026 370/335 |
| 2008/0026744 | A1* | 1/2008 | Frederiksen | H04L 1/0026 455/425 |
| 2008/0268863 | A1 | 10/2008 | Pedersen et al. | |
| 2009/0046667 | A1* | 2/2009 | Pelletier | H04W 52/286 370/335 |
| 2010/0113057 | A1* | 5/2010 | Englund | H04L 1/0026 455/452.1 |
| 2011/0141926 | A1* | 6/2011 | Damnjanovic | H04L 1/0026 370/252 |
| 2013/0142178 | A1* | 6/2013 | Kim | H04W 76/048 370/336 |

OTHER PUBLICATIONS

Ericsson, "CQI Reporting with regards to DRX operation," 3GPP TSG-RAN WG2 Meeting #58, Kobe, Japan, May 7-11, 2014, R2-071847, Agenda Item 4.13, 2 pages.

Ericsson et al, "Further details on CQI Report Reduction," 3GPP TSG-RAN WG1 Meeting #73, Fukuoka, Japan, May 20-24, 2013, Agenda Item 5.6.3, R1-132614, 2 pages.

Philips, "Control of CQI feedback signalling in E-UTRA," 3GPP TSG RAN WG1 Meeting #47, Riga, Latvia, Nov. 6-10, 2006, XP-002475857, 3 pages.

\* cited by examiner

METHODS AND ARRANGEMENTS FOR MANAGING REPORTING OF CHANNEL QUALITY

CROSS REFERENCE TO RELATED APPLICATION(S)

This application is a 35 U.S.C. §371 National Phase Entry Application from PCT/SE2013/051620 filed Dec. 23, 2013, which claims priority to US provisional patent application no. 61/754,034 filed on Jan. 18, 2013. The above identified applications are incorporated by reference in their entirety.

TECHNICAL FIELD

Embodiments herein relate to a method performed by a wireless device, a wireless device, a method performed by one or more network nodes of a mobile radio communication network, e.g. of a telecommunications system, and the one or more network nodes. In particular embodiments herein relate to managing reporting of channel quality.

BACKGROUND

Communication devices such as wireless devices may be also known as e.g. user equipments (UEs), mobile terminals, wireless terminals and/or mobile stations. A wireless device is enabled to communicate wirelessly in a cellular communications network, wireless communications system, or radio communications system, sometimes also referred to as a cellular radio system, cellular network, cellular communications system or simply cellular system. A typical example of such system or network, depending on terminology used, is a telecommunications system for mobile communications. The communication may be performed e.g. between two wireless devices, between a wireless device and a regular telephone and/or between a wireless device and a server via a Radio Access Network (RAN) and possibly one or more core networks, comprised within the cellular communications network. The wireless device may further be referred to as a mobile telephone, cellular telephone, laptop, Personal Digital Assistant (PDA), tablet computer, just to mention some further examples. The wireless device may be, for example, portable, pocket-storable, hand-held, computer-comprised, or vehicle-mounted mobile device, enabled to communicate voice and/or data, via the RAN, with another entity, such as another wireless device or a server.

The cellular communications network covers a geographical area which is divided into cell areas, wherein each cell area is served by at least one base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided according to a Radio Access Technology (RAT) and at a carrier frequency by the base station at a base station site. The base station may support one or several communication technologies, such as RATs. Cells may overlap so that several cells cover the same geographical area. By the base station serving a cell is meant that the radio coverage is provided such that one or more wireless devices located in the geographical area where the radio coverage is provided may be served by the base station. One base station may serve one or several cells. When one base station serves several cells, these may be served according to the same or different RATs, and/or may be served at same or different carrier frequencies. The base stations communicate over the air interface operating on radio frequencies with one or more wireless devices within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile). In 3rd Generation Partnership Project (3GPP) Long Term Evolution (LTE), base stations, which may be referred to as eNodeBs or eNBs, may be directly connected to other base stations and may be directly connected to one or more core networks.

Wireless communication systems following Universal Mobile Telecommunications Systems (UMTS) technology, were developed as part of Third Generation (3G) Radio Systems, and is maintained by the Third Generation Partnership Project (3GPP). UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE. One example of a cellular communications system is UMTS WCDMA.

The expression downlink (DL) is used for the transmission path from the RAN, typically from a base station thereof, to the wireless device. The expression uplink (UL) is used for the transmission path in the opposite direction i.e. from the wireless device to the RAN, typically to a base station thereof.

In a multi Radio Access Bearer, multi-RAB, e.g. speech and Packet Switched (PS) data uses the same RAB. In a situation where speech is configured on a Dedicated Channel (DCH) and the PS part is configured on Enhanced Uplink (EUL) and HSDPA, live network statistics has shown that it has a significantly higher drop rate than the stand-alone Speech RAB.

SUMMARY

An object is to provide improvements with regard to the higher drop rate of multi-RAB, e.g. speech and PS data, compared to stand-alone speech RAB.

According to a first aspect of embodiments herein, the object is achieved by a method, performed by a wireless device, for managing reporting of channel quality. The wireless device is configured to communicate with a mobile radio communication network. The wireless device identifies there being no downlink activity between the wireless device and the mobile radio communication network. The wireless device reduces, in response to the identification, a level of channel quality reporting when there is no downlink activity.

According to a second aspect of embodiments herein, the object is achieved by a computer program comprising instructions that when executed by a data processing apparatus causes a wireless device to perform the method according to the first aspect.

According to a third aspect of embodiments herein, the object is achieved by a computer program product, comprising a computer-readable memory storing a computer program according to the second aspect.

According to a fourth aspect of embodiments herein, the object is achieved by a method, performed by a mobile radio communication network, for managing reporting of channel quality of a wireless device. The one or more network nodes sends, to the wireless device, a configuration for configuring the wireless device to: Identify when there is no downlink activity between the wireless device and the mobile radio communication network. Reduce, in response to the identification, a level of channel quality reporting when there is no downlink activity.

According to a fifth aspect of embodiments herein, the object is achieved by a computer program comprising instructions that when executed by a data processing apparatus causes one or more network nodes of a mobile radio communication network to perform the method according to the fourth aspect.

According to a sixth aspect of embodiments herein, the object is achieved by a computer program product, comprising a computer-readable memory storing a computer program according to the fifth aspect.

According to a seventh aspect of embodiments herein, the object is achieved by a wireless device for managing reporting of channel quality. The wireless device is configured to communicate with a mobile radio communication network. The wireless device is further configured to identify there being no downlink activity between the wireless device and the mobile radio communication network, and, in response to the identification, reduce a level of channel quality reporting when there is no downlink activity.

According to an eight aspect of embodiments herein, the object is achieved by a mobile radio communication network, for managing reporting of channel quality of a wireless device. The one or more network nodes are configured to send, to the wireless device, a configuration for configuring the wireless device. The configuration is for configuring the wireless device to identify when there is no downlink activity between the wireless device and the mobile radio communication network, and reduce, in response to the identification, a level of channel quality reporting when there is no downlink activity.

Embodiments herein reduce channel quality reporting, e.g. the amount of CQI reporting, when there is no downlink activity, and e.g. during coverage-limited scenarios. In a multi-RAB scenario this supports reduction of a higher drop rate of multi-RAB, e.g. speech and data, compared to e.g. stand-alone speech RAB.

BRIEF DESCRIPTION OF THE DRAWINGS

Examples of embodiments herein are described in more detail with reference to the appended schematic drawings.

DETAILED DESCRIPTION

Figure 1:
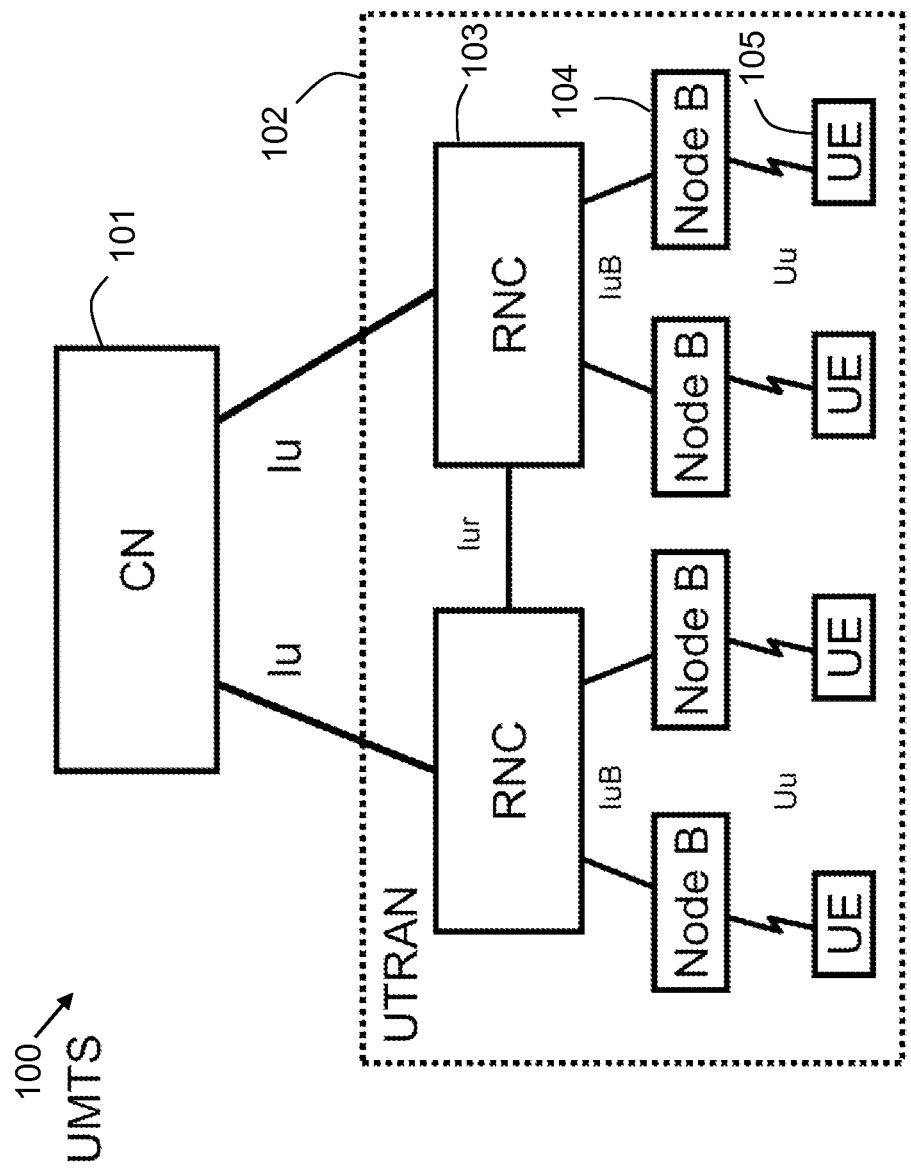
FIG. 1 is a schematic block diagram depicting an example of a cellular communication system corresponding to an overview of an UMTS system, in relation to which embodiments herein are explained.

Before presenting embodiments herein and as part of the development towards embodiments herein, the situation and problem indicated in the Background will be further discussed.

At least part of the degradation discussed in the Background has been attributed to the difference in UL coverage between the two RAB combinations. Given a specific scenario and a specific radio environment, the UL coverage of a connection is limited by the maximum UE power available and the minimum amount of information that needs to be transmitted on the UL. For stand-alone Speech, the UL physical channels and the information transmitted include the following (with explanations of the abbreviations being used at the end):

| 1. | DPCCH | Layer 1 control information |
| --- | --- | --- |
| 2. | DPDCH | Speech frames and Radio Resource Control (RRC) messages | and for the multi-RAB, "Speech+PS Interactive"

| 1. | DPCCH | Layer 1 control information |
| --- | --- | --- |
| 2. | DPDCH | Speech frames and RRC messages |
| 3. | HS-DPCCH | Channel Quality Index (CQI) reports and ACKnowledge/Negative AcKnowledge (ACK/NAK) for HSDPA transmissions |
| 4. | E-DPCCH | Control information for Enhanced UL (EUL) transmissions |
| 5. | E-DPDCH | Data transmitted on EUL |

Explanation of abbreviations used above:
Dedicated Physical Control Channel (DPCCH),
Dedicated Physical Data Channel (DPDCH),
High Speed Downlink shared CHannel (HS-DSCH),
Dedicated Physical Control Channel (uplink) for HS-DSCH (HS-DPCCH),
Enhanced Dedicated CHannel (E-DCH)
E-DCH DPCCH (E-DPCCH), and
E-DCH DPDCH (E-DPDCH).

When a UE is power limited, all the physical channels and information listed above have to share the total available UE power. 3GPP has also specified that control information and data transmitted on a DCH (i.e., one carried on a DPDCH) take precedent over data transmitted on EUL.

For the multi-RAB in a coverage-limited environment where there is not enough power to go around, UL data will be the first to suffer, i.e., not transmitted. Since most DL data requires some kind of feedback on the UL, DL data will also stop if the condition persists. What is left are the DPCCH, DPDCH, and the CQI reports carried on the HS-DPCCH.

Accurate and up-to-date CQI reports are critical for efficient HSDPA transmissions. In the current 3GPP standard, CQI reporting is configured with a fixed periodicity without consideration of need, i.e., if there is ongoing DL transmission.

The frequent transmission of CQI reports when there is no DL data activity has the following problems:

It creates unnecessary UL interference.

More importantly, in coverage-limited scenarios, it takes power away from the DPCCH, the Speech frames and the RRC messages. This affects the quality of the connection, speech quality, and the transmission of RRC messages, which may be carrying measurement reports for handover events that are needed for rectifying the coverage problem.

Changing the amount of CQI reporting may require a so called Layer 3 reconfiguration of the connection, which may endanger the connection when performed during coverage-limited situations.

In view of the above, it is of interest to reduce the level of channel quality reporting, such as CQI reports, in a multi-RAB scenario.

FIG. 1 is a schematic block diagram depicting an example of a cellular communication system 100 in the form of an overview of an UMTS system, in relation to which embodiments herein are explained. The cellular communication system 100, that in accordance with the previous discussion also may be named mobile radio communication system, such as a UMTS type system as shown in FIG. 1, includes a mobile radio communication network 102 communicating with mobile radio terminals, or simply mobile terminals or wireless devices, including a wireless device 105, that also may be named UEs, e.g. in the 3GPP standards, as already mentioned above, and with external networks. The cellular communication system 100, e.g. an UMTS network architecture, includes a Core Network (CN) 101 interconnected with the mobile radio communication network 102, e.g. UTRAN, via, at least in the case of UTRAN, a so called Iu interface. The mobile radio communication network 102 is e.g. configured to provide wireless telecommunication services to users through the wireless devices, via, at least in the case of UTRAN, a so called Uu radio interface. A commonly employed air interface defined in the UMTS standard is WCDMA as mentioned in the Background. The mobile radio communication network 102 comprises one or more RNCs, including a RNC 103, and base stations, including a base station 104 referred to as Node Bs by 3GPP, which collectively provide for the geographic coverage for wireless communications with the wireless devices. One or more of the wireless devices may be connected to each RNC, via, at least in the case of UTRAN, a so called Iub interface. RNCs within a UTRAN communicate via a so called Iur interface.

The reduced level of CQI reporting may be accomplished and/or used in a number of different situations, bellow is described some different example situations where reduction of CQI reporting may be beneficial.

1. No Data Activity

A mobile network, e.g. the mobile radio communication network 102, signals to a UE, e.g. the wireless device 105, during connection setup or reconfiguration to set up the following:

An inactivity timer for measuring DL inactivity.

A "reduced" level of the CQI reporting frequency, ranging from 100% of the original level to zero, i.e., no reporting.

Figure 2:
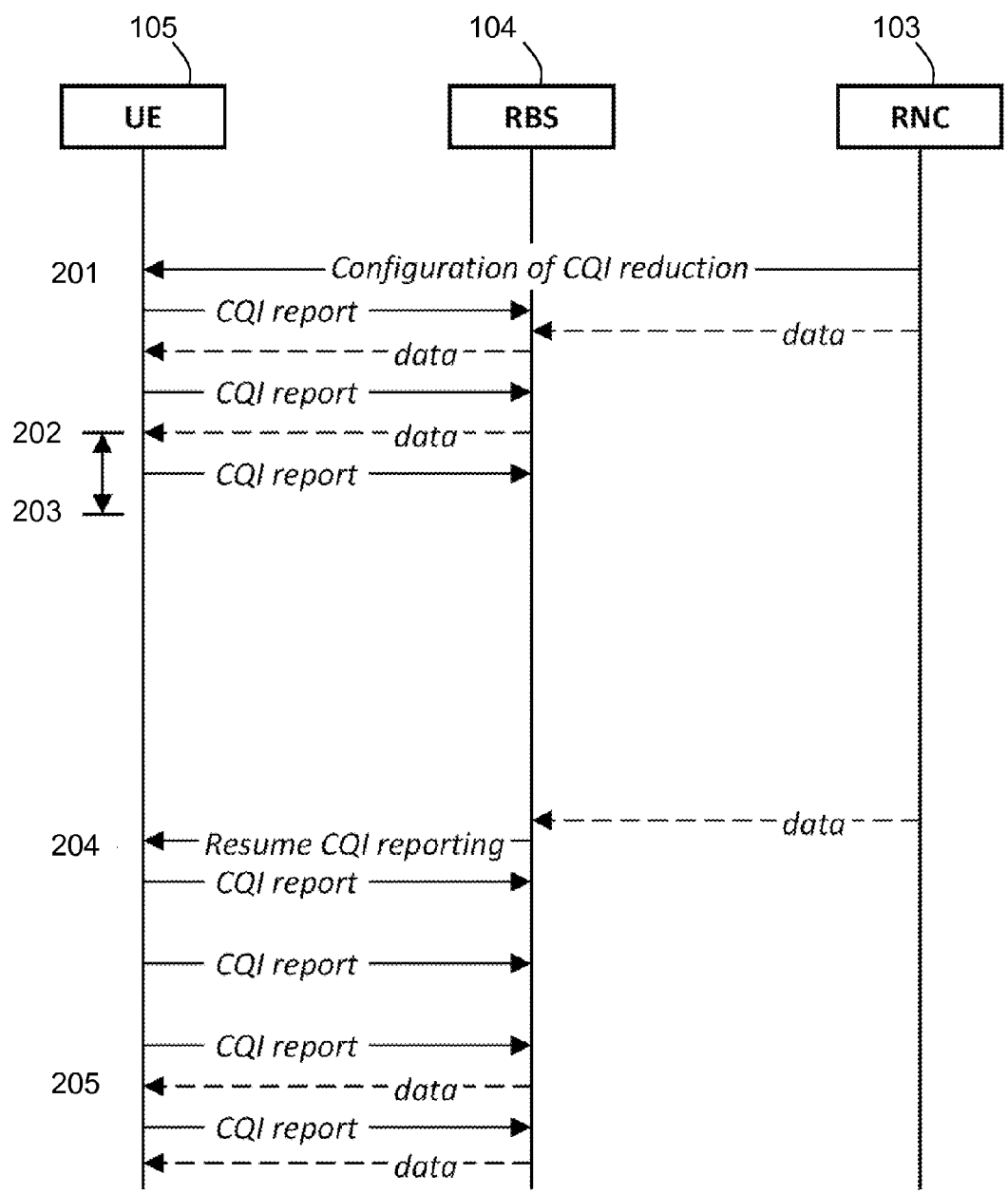
FIG. 2 shows a signaling diagram schematically illustrating an example of embodiments herein when an inactivation timer is used.

FIG. 2 schematically shows an example illustrating the procedure involved in the case where a rather short inactivity timer is configured and no CQI report is to be sent during the reduced CQI reporting state.

201. The wireless device 105 is configured by the RNC 103 with the conditions for CQI reduction. In response to on going DL traffic, normal CQI reporting is performed.

202. DL data transmissions ends, which triggers the starting of the configured inactivity timer.

203. The inactivity timer expires and CQI reporting stops.

204. DL data arrives at the base station 104. The base station 104 requests on-demand CQI reporting by sending an High Speed-Shared Control Channel (HS-SCCH) order to the wireless device 105 to instruct the wireless device 105 to resume normal CQI reporting. In this example, a rather long duration for the on-demand reporting has been configured.

205. The base station 104 has received sufficient number of CQI reports (e.g., for averaging or some other CQI adjustment algorithms) and starts transmitting data to the UE.

In an alternative solution, the network may signal one or several of the following information to be used during the "reduced" level period: measurement power offset, the CQI feedback cycle, CQI repetition factor, delta CQI.

In addition the network may indicate an algorithm for triggering the reduction of CQI reporting as follows:

When there is no DL data transmission for a duration specified by the length of the inactivity timer, the UE shall reduce the amount of CQI reporting to the specified "reduced" level.

When DL activity commences, the UE shall switch back to the original, un-reduced level of CQI reporting.

In a further alternative solution, one or both algorithms described above are not signaled but are implemented in the wireless device 105, and additionally, UL data activity can also be taken into account by including UL activity in the triggering algorithm so that CQI reduction is triggered only when both UL and DL are inactive. This may or may not be configured by the mobile radio communication network 102.

2. Low Power Headroom

The mobile radio communication network 102 may also configure the wireless device 105 with a power headroom threshold for the wireless device, which may be referred to as a UE power headroom threshold, as an alternative or additional criterion for CQI reduction. The power headroom may indicate the fraction of power available after subtracting the DPCCH power from the total wireless device power, which may be referred to as UE total power. Upon reception of this threshold, the wireless device 105 may reduce the amount CQI reporting if the power headroom (measured internally in the wireless device 105) drops below the threshold.

The power headroom and the inactivity criteria may be used separately or combined in a way so that CQI reduction is triggered when (1) both criteria are satisfied or (2) either one of the criterion is satisfied.

In addition, the network may configure a hysteresis so that the wireless device 105 does not start with the normal CQI reporting until the power headroom is not above the sum of the threshold and the hysteresis.

3. On-Demand CQI Reporting

Additionally, a new High Speed Shared Control Channel (HS-SCCH) order and a duration may be configured for the purpose of triggering on-demand CQI reporting. When DL data arrives while reduced CQI reporting is in effect, the base station 103 may use the HS-SCCH order to instruct the wireless device 105 to return CQI reporting back to the normal level immediately for a period given by the configured duration. That is, the wireless device 105 may, on-demand, perform CQI reporting, e.g. return to normal level.

Figure 3:
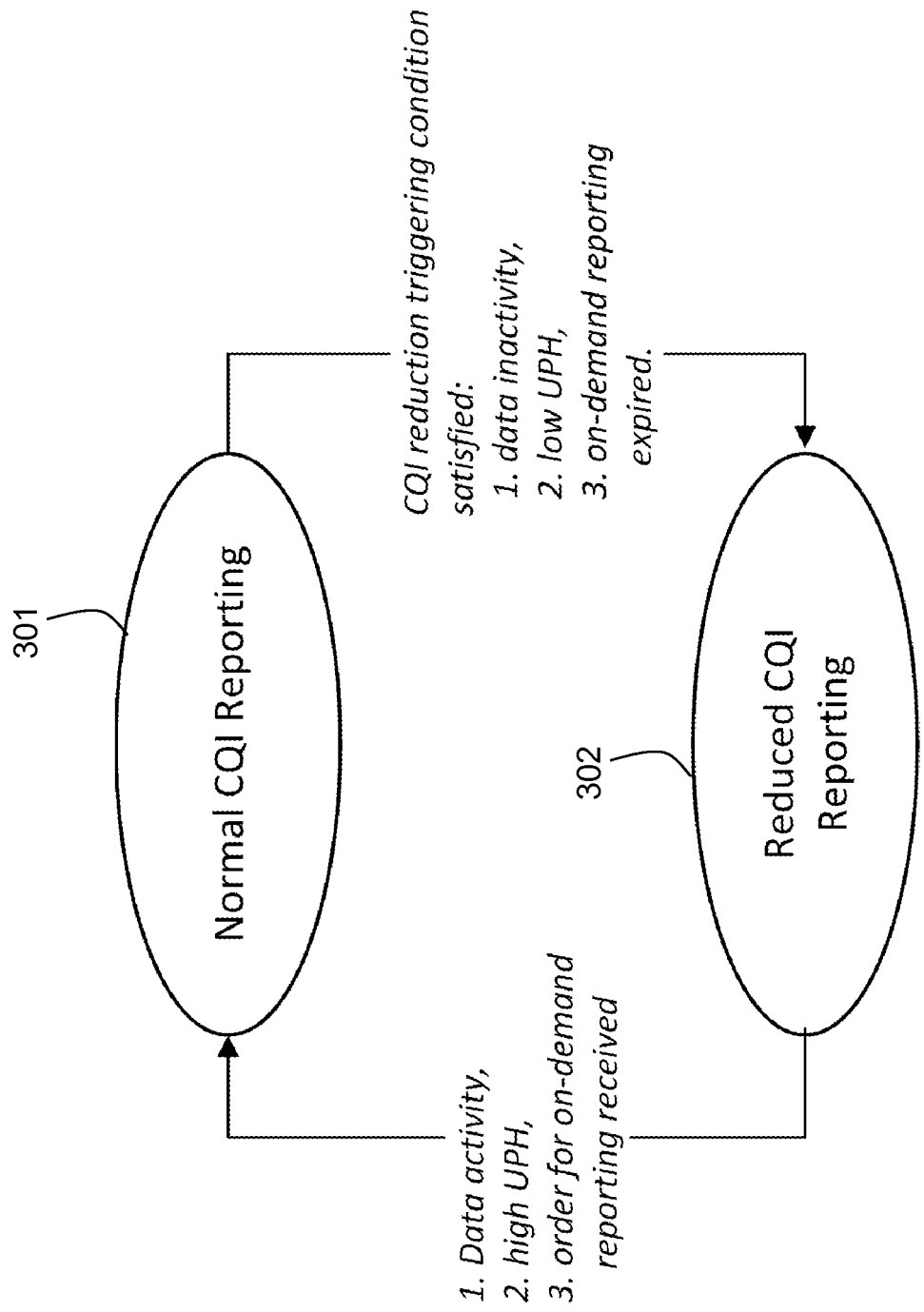
FIG. 3 is a schematic block diagram for describing how different CQI reporting states may be altered according to embodiments herein.

FIG. 3 shows the two CQI reporting states of a UE, e.g. the wireless device 105. The shown transitions from a normal CQI reporting state 301 to a reduced CQI reporting state 302 may be based on one or more configured triggering conditions. For example, triggering conditions may be the expiring of the inactivity timer, or that the power headroom has dropped below the configured threshold, or that on-demand reporting has been triggered for a time longer than the configured duration, or any combination of these conditions. In the figure, UE Power Headroom (UPH) refers to the power headroom. Similarly, transitions back to the normal CQI reporting state 301 may be based on one or more configured triggering conditions, e.g. at the start of any data activity, or that the power headroom has increased beyond the configured threshold, or that a HS-SCCH order for on-demand CQI reporting has been received.

Figure 4:
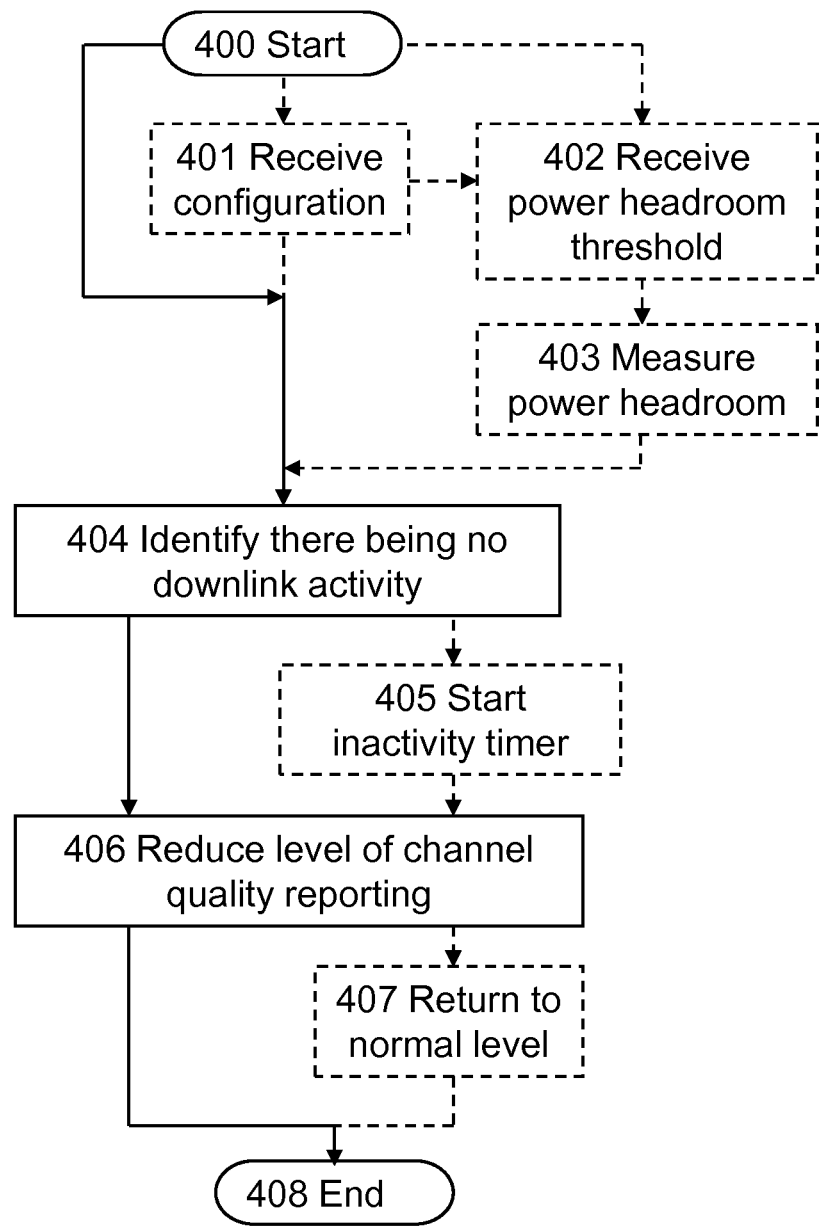
FIG. 4 is a flow chart illustrating a method, performed by a wireless device, according to embodiments herein.

Embodiments herein relating to a method, performed by the wireless device 105, for managing reporting of channel quality, e.g. CQI, will now be further elaborated and described with reference to the flowchart depicted in FIG. 4. As already mentioned, the wireless device 105 is configured to communicate with the mobile radio communication network 102.

The method comprises the following actions, which actions may be taken in any suitable order. Further, actions may be combined.

Action 401

The wireless device 105 may receive, from the mobile radio communication network 102, a configuration for configuring the wireless device 105 to perform according to one or more of Actions 402-407.

Action 402

The wireless device 105 may receive a power headroom threshold from the mobile radio communication network 102. It is realized that the threshold in practice typically is in the form of a value or number.

Action 403

The wireless device 105 may measure a power headroom, the power headroom may indicate a fraction of power available after subtracting power of physical control channel, e.g. a dedicated physical control channel, from total power of the wireless device 105.

Action 404

The wireless device 105 identifies there being no downlink activity between the wireless device 105 and the mobile radio communication network 102.

In some embodiments, the reduction of the level of channel quality reporting is further in response to identification of an uplink coverage limited scenario. As used herein, it should be realized that the uplink coverage limited scenario may be described as a scenario where the wireless device 105 is limited in power for provision of uplink coverage. Or in other words, a scenario where, without the power limitation, more power would be used by the wireless device 151 to provide uplink coverage.

In some embodiments, the reduction of the level of channel quality reporting is further in response to identification of a multi Radio Access Bearer for speech and data.

Action 405

The wireless device 105 may start an inactivity timer when there is no downlink activity between the wireless device 105 and the mobile radio communication network 102.

Action 406

The wireless device 105 reduces, in response to the identification in action 401, when there is no downlink activity.

The channel quality reporting may be reduced in response to that the inactivity timer, as started in action 405, expires and there has been no downlink activity between the wireless device 105 and the mobile radio communication network 102 since the inactivity timer started.

The reduction of the level of channel quality reporting may be further in response to identification that the, in action 403, measured power headroom drops below the, in action 402, received power headroom threshold.

Action 407

The wireless device 105 may return to a normal channel quality reporting from the reduced level of channel quality reporting. The return may be in response to one or more of the following:

Receipt, by the wireless device 105, of an instruction from the mobile radio communication network 102, which instruction instructs the wireless device 105 to return to the normal channel quality reporting.

That the no downlink activity, as identified in action 401, is no longer to be identified.

Figure 5:
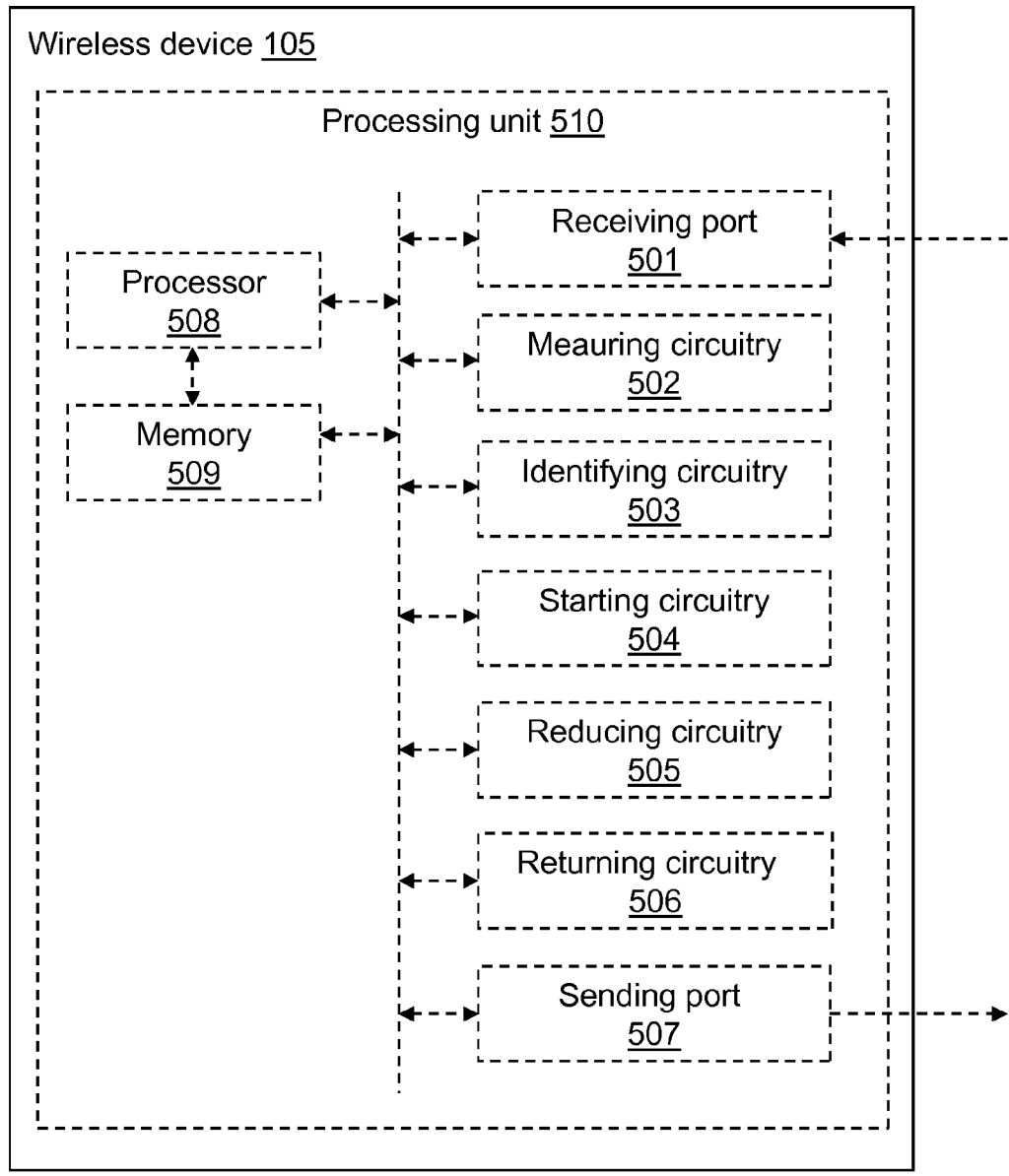
FIG. 5 is a schematic block diagram illustrating a wireless device according to embodiments herein.

To perform the actions 401-407 for managing reporting of channel quality, the wireless device 105 may comprise an arrangement schematically depicted in FIG. 5.

The wireless device 105, e.g. a receiving port 501 comprised in the wireless device 105, may be configured to receive said power headroom threshold from the mobile radio communication network 102. Moreover, the wireless device 105, e.g. the receiving port 501, may be configured to receive, from the mobile radio communication network 102, said configuration. In general, the receiving port 501 may be configured to participate in downlink wireless transmission.

The wireless device 105, e.g. a measuring circuitry 502 comprised in the wireless device 105, may be configured to measure said power headroom.

The wireless device 105, e.g. an identifying circuitry 503 comprised in the wireless device 105, is configured to identify there being no downlink activity between the wireless device 105 and the mobile radio communication network 102.

The wireless device 105, e.g. a starting circuitry 504 comprised in the wireless device 105, may be configured to start said inactivity timer when there is no downlink activity between the wireless device 105 and the mobile radio communication network 102.

The wireless device 105, e.g. a reducing circuitry 505 comprised in the wireless device 105, is configured to, in response to the identification of there being no downlink activity between the wireless device 105 and the mobile radio communication network 102, reduce said level of channel quality reporting when there is no downlink activity.

The wireless device 105, e.g. a returning circuitry 506 comprised in the wireless device 105, may be configured to return to said normal channel quality reporting from the reduced level of channel quality reporting.

The wireless device 105 also, of course, typically comprises a sending port 507 that in general is configured to participate in uplink wireless transmission.

The embodiments of the wireless device 105 may be fully or partly implemented through one or more processors, such as a processor 508 depicted in FIG. 5, together with a computer program for performing the functions and actions of embodiments herein. In some embodiments the circuitry and ports discussed above may be fully or partially implemented by the processor 508.

In some embodiments, illustrated with support from the schematic drawings in FIGS. 9a-c, further explained separately below, there is provided a computer program 901a comprising instructions that when executed by a a data processing apparatus, e.g. the processor 508, causes the wireless device 105 to perform the method according to embodiments herein as described above.

Figure 9A:
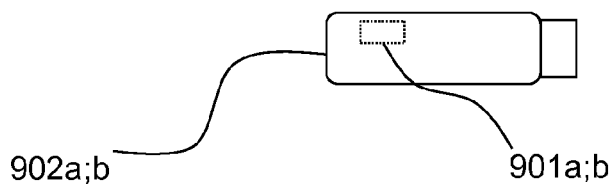
FIGS. 9a-c are schematic drawings for illustrating embodiments related to computer program embodiments.
Figure 9B:
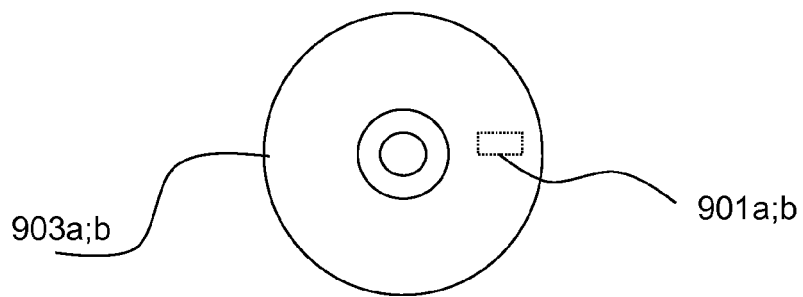
Figure 9C:
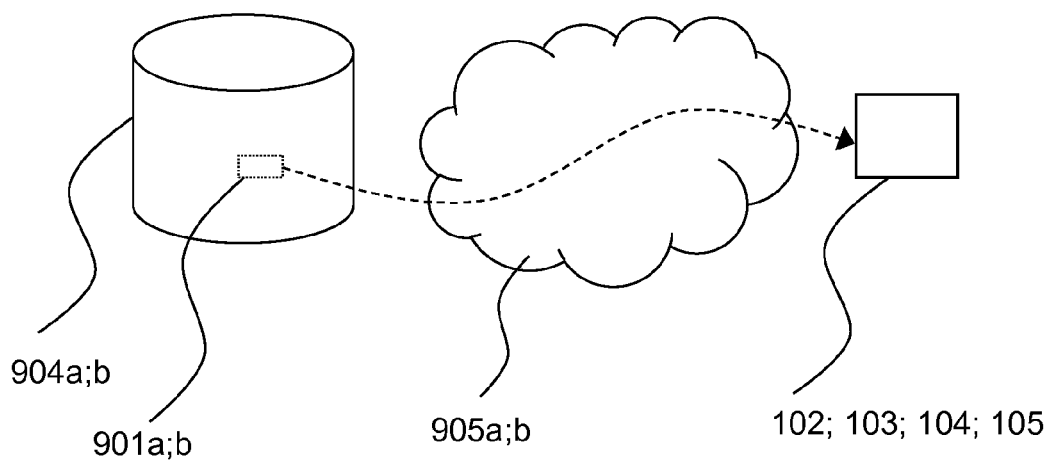

In some embodiments, also illustrated with support from the schematic drawings in FIGS. 9a-c, there is provided a computer program product, comprising a computer-readable memory on which the computer program 901a is stored. Examples of the a computer-readable memory is a memory card or a memory stick 902a as in FIG. 10a, a disc storage medium 903a such as a CD or DVD as in FIG. 10b, a mass storage device 904a as in FIG. 10c. The mass storage device 904a is typically based on hard drive(s) or Solid State Drive(s) (SSD). The mass storage device 904a may be such that is used for storing data accessible over a computer network 905a, e.g. the Internet or a Local Area Network (LAN).

The computer program 901a may furthermore be provided as a pure computer program or comprised in a file or files. The file or files may be stored on the computer-readable memory and e.g. available through download e.g. over the computer network 905a, such as from the mass storage device 904a via a server. The server may e.g. be a web or ftp server. The file or files may e.g. be executable files for direct or indirect download to and execution on the wireless device 105, e.g. on the processor 508, or may be for intermediate download and compilation involving the same or another processor to make them executable before further download and execution.

The wireless device 105 may further comprise a memory 509 comprising one or more memory units. The memory 509 is arranged to store data, such as configurations and/or applications involved in or for performing the functions and actions of embodiments herein.

Those skilled in the art will also appreciate that the ports and circuitry 501-507 may refer to a combination of analog and digital circuits, and/or one or more processors configured with software and/or firmware (e.g., stored in memory) that, when executed by the one or more processors such as the processor 508, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

As a further example, the wireless device 105 may comprise a processing unit 510, which may comprise one or more of the circuit(s) and/or port(s) etc mentioned above. As used herein, the term "processing circuit" may relate to a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software and/or hardware module.

Figure 6:
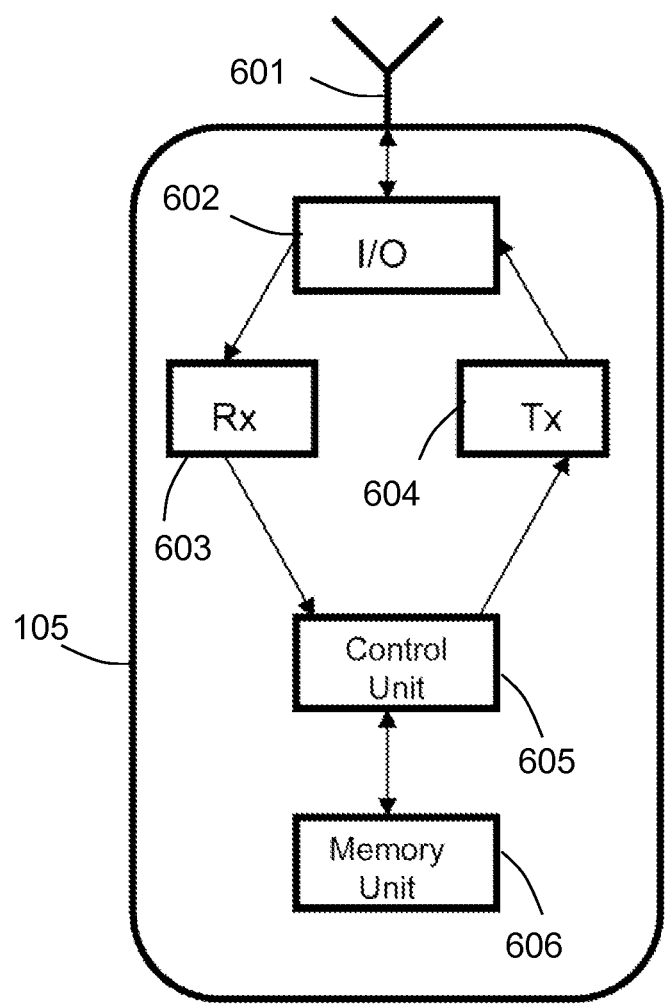
FIG. 6 is another block diagram illustrating a structure exemplary wireless device.

FIG. 6 shows an alternative block diagram of the wireless device 105 configured for implementing the above-described technology and algorithms, i.e. including embodiments herein. The wireless device 105 corresponds to the wireless device 105 as illustrated in FIG. 5, although here described with a different view. The UE is equipped with an antenna unit 601, an Input/Output (I/O) unit 602, a receive unit (Rx) 603, a transmit unit (Tx) 604, a control unit 605 and a memory unit 606. The function of the wireless device 105 is mainly controlled by the control unit 605, suitably with the aid of the memory unit 606. The control unit 605 may e.g. be implemented by a single or multiple core micro-processor. The memory unit 606, coupled to the control unit, may be implemented by a random access memory (RAM), read-only memory (ROM), a hard disk drive, or the like. The antenna unit 601, the I/O-unit 602 and the Rx 603 may fully or partly correspond to the receiving port 501 in FIG. 5. The antenna unit 601, the I/O-unit 602 and the Tx 604 may fully or partly correspond to the sending port 507 in FIG. 5. The control unit 605 and the memory unit 606 may fully or partly correspond to the processor 508 and memory 509, and/or the circuitry 502-506, in FIG. 5.

Figure 7:
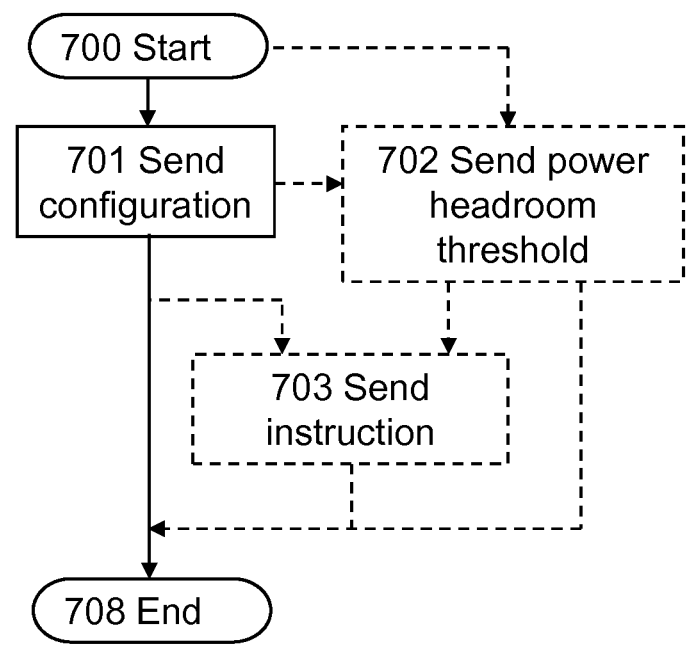
FIG. 7 is a flow chart illustrating a method, performed by a mobile radio communication network, according to embodiments herein.

Embodiments herein relating to a method, performed by the mobile radio communication network 102, for managing reporting of channel quality, e.g. CQI, will now be further elaborated and described with reference to the flowchart depicted in FIG. 7. As should be realized by the skilled person, there are one or more network nodes, e.g. the RNC 103 and/or base station 104, of the mobile radio communication network 102 that in practice are involved in performing the method. However, it is further realized that what exact nodes being involved may be depend on RAT and/or on choice of implementation. Hence, in the following, with regard to the method performed by the mobile radio communication network 102, it is in practice typically performed by one more network nodes of the mobile radio communication network 102, e.g. the RNC 103 and/or base station 104.

The method comprises the following actions, which actions may be taken in any suitable order. Further, actions may be combined.

Action 701

The mobile radio communication network 102 sends, to the wireless device 105, a configuration for configuring the wireless device 105 to identify when there is no downlink activity between the wireless device (105) and the mobile radio communication network (102), and, in response to the identification, reduce a level of channel quality reporting when there is no downlink activity.

The configuration may be further for configuring the wireless device 105 to start an inactivity timer when there is no downlink activity between the wireless device 105 and the mobile radio communication network 102. The channel quality reporting may be reduced in response to that the inactivity timer expires and there has been no downlink activity between the wireless device 105 and the mobile radio communication network 102 since the inactivity timer started.

In some embodiments, the configuration is further for configuring the wireless device 105 to return to a normal channel quality reporting from the reduced level of channel quality reporting in response to that said no downlink activity is no longer to be identified.

In some embodiments, the reduction of the level of channel quality reporting is further in response to identification of an uplink coverage limited scenario.

In some embodiments, the reduction of the level of channel quality reporting is further in response to identification of a multi Radio Access Bearer for speech and data.

Action 702

The mobile radio communication network 102 may send a power headroom threshold to the wireless device 105. The configuration may be further for configuring the wireless device 105 to measure a power headroom, the power headroom indicting a fraction of power available after subtracting power of a dedicated physical control channel from total power of the wireless device 105. The reduction of the level of channel quality reporting may be further in response to identification that the measured power headroom drops below the received power headroom threshold.

Action 703

The mobile radio communication network 102 may send, to the wireless device 105, an instruction instructing the wireless device 105 to return to a normal channel quality reporting from the reduced level of channel quality reporting. The configuration may further be for configuring the wireless device 105 to, in response to receipt of said sent instruction, return to the normal channel quality reporting from the reduced level of channel quality reporting.

Figure 8:
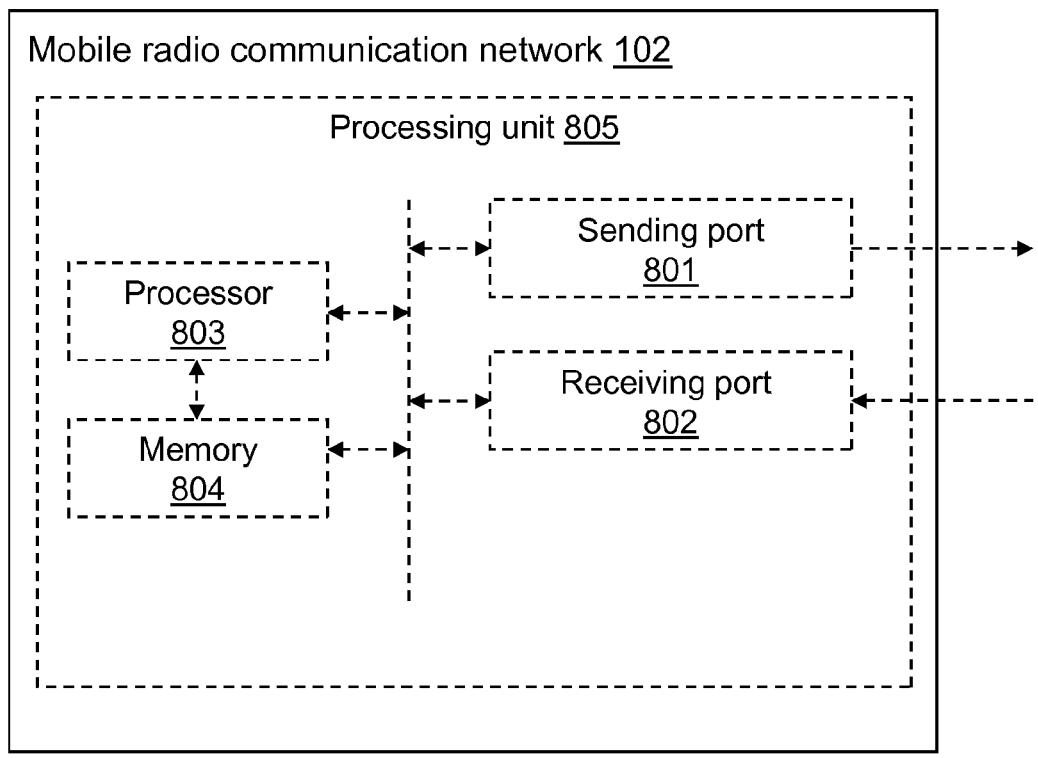
FIG. 8 is a schematic block diagram illustrating one or more network nodes of a mobile radio communication network according to embodiments herein.

To perform the actions 701-703 for managing reporting of channel quality, the mobile radio communication network 102 may comprise an arrangement schematically depicted in FIG. 8. As above, in practice it is typically one more network nodes of the mobile radio communication network 102, e.g. the RNC 103 and/or base station 104, that comprise the arrangement.

The mobile radio communication network 102, e.g. a sending port 802 comprised in the mobile radio communication network 102, may be configured to send to the wireless device 105, said configuration for configuring the wireless device 105 to identify when there is no downlink activity between the wireless device 105 and the mobile radio communication network 102, and reduce, in response to the identification, said level of channel quality when there is no downlink activity.

In some embodiments, the mobile radio communication network 102, e.g. the sending port 802, may be configured to send said power headroom threshold to the wireless device 105.

In some embodiments, the mobile radio communication network 102, e.g. the sending port 802, may be configured to send, to the wireless device 105, said instruction instructing the wireless device 105 to return to said normal channel quality reporting from the reduced level of channel quality reporting.

In general, the sending port 801 may be configured to participate in downlink transmission.

The wireless device 105 also, of course, typically comprises a receiving port 802 that in general may be configured to participate in uplink transmission.

The embodiments of the mobile radio communication network 102, i.e. in practice of the one or more network nodes, e.g. the RNC 103 and/or base station 104, of the mobile radio communication network 102, may be fully or partly implemented through one or more processors, such as a processor 803 depicted in FIG. 8, together with a computer program for performing the functions and actions of embodiments herein. In some embodiments the ports discussed above may be fully or partially implemented by the processor 803.

In some embodiments, illustrated with support from the schematic drawings in FIG. 9, there is provided a computer program 901b comprising instructions that when executed by a a data processing apparatus, e.g. the processor 803, causes the mobile radio communication network 102 to perform the method according to embodiments herein as described above.

In some embodiments, also illustrated with support from the schematic drawings in FIGS. 9a-c, further explained separately below, there is provided a computer program product, comprising a computer-readable memory on which the computer program 901b is stored. Examples of the a computer-readable memory is a memory card or a memory stick 902b as in FIG. 9a, a disc storage medium 903b such as a CD or DVD as in FIG. 10b, a mass storage device 904b as in FIG. 10c. The mass storage device 904b is typically based on hard drive(s) or Solid State Drive(s) (SSD). The mass storage device 904b may be such that is used for storing data accessible over a computer network 905b, e.g. the Internet or a Local Area Network (LAN).

The computer program 901b may furthermore be provided as a pure computer program or comprised in a file or files. The file or files may be stored on the computer-readable memory and e.g. available through download e.g. over the computer network 905b, such as from the mass storage device 904b via a server. The server may e.g. be a web or ftp server. The file or files may e.g. be executable files for direct or indirect download to and execution in the mobile radio communication network 102, e.g. on the RNC 103 and/or base station 104, e.g. on the processor 803, or may be for intermediate download and compilation involving the same or another processor to make them executable before further download and execution.

The mobile radio communication network 102 may further comprise a memory 804 comprising one or more memory units. The memory 804 is arranged to store data, such as configurations and/or applications involved in or for performing the functions and actions of embodiments herein.

Those skilled in the art will also appreciate that the ports 801-802 may refer to a combination of analog and digital circuits, and/or one or more processors configured with software and/or firmware (e.g., stored in memory) that, when executed by the one or more processors such as the processor 803, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

As a further example, mobile radio communication network 102 may comprise a processing unit 805, which may comprise one or more of the port(s) etc mentioned above. As used herein, the term "processing circuit" may relate to a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software and/or hardware module.

FIGS. 9a-c, already mentioned above, are schematic drawings for illustrating embodiments related to computer program embodiments and have been used and discussed above. Note that the same FIGS. 9a-c have been used to illustrate separate embodiments regarding the wireless device 105 and the mobile radio communication network 102. The only reason for this is to avoid duplicating the illustrations in FIG. 9, and shall thus not be construed as that e.g. computer programs related to the wireless device 105 and mobile radio communication network 102 are the same and/or need to be stored together on the same data carrier. To accentuate that FIGS. 9a-c in fact show separate embodiments, different numerals have been used for the same element show in FIG. 10, e.g. there are two separate computer programs 901a and 901b, which may be on respective separate data carrier, e.g. the computer program 901a on memory stick 902a, and separate from this, the computer program 901b on another memory stick 902b.

As should be understood from the above, the technology disclosed herein provides methods and devices, for reducing channel quality reporting, e.g. the amount of CQI reporting, during e.g. uplink coverage-limited scenarios. This is of particular interest in a multi-RAB scenario in order to reduce a higher drop rate of multi-RAB, e.g. speech and PS data, compared to stand-alone speech RAB.

Advantages of embodiments herein include reduction of the impact of extra control channels on the coverage of multi-RABs, and also reduction of the amount of UL interference. Although initial focus has been on improving coverage of a "Speech+PS Interactive" multi-RAB, embodiments herein apply equally well to stand-alone Interactive RABs configured on EUL and HSDPA.

Some examples relating to embodiments herein:

In a first example the CQI reporting level is reduced when there is no DL activity. An inactivity timer is introduced, and the CQI reporting level is reduced when the timer expires.

In a second example the mobile network may configure the UE with a UE power headroom threshold as an alternative or additional criterion for CQI reduction. The UE power headroom indicates the fraction of power available after subtracting the DPCCH power from the total UE total power. Upon reception of this threshold, the UE shall reduce the amount CQI reporting if the UE power headroom (measured internally in the UE) drops below the threshold.

In a third example the UE may be configured for the purpose of triggering on-demand CQI reporting. When DL data arrives while reduced CQI reporting is in effect, the network instructs the UE to return to normal CQI reporting immediately for a given period of time.

Embodiments herein have been described above with reference to the drawings, such as block diagrams and/or flowcharts. It is understood that several blocks of the block diagrams and/or flowchart illustrations, and combinations of blocks in the block diagrams and/or flowchart illustrations, may be implemented by computer program instructions. Such computer program instructions may be provided to a processor of a general purpose computer, a special purpose computer and/or other programmable data processing apparatus, e.g. the processor 508, the processing unit 510, the processor 803, the processing unit 805, just to mention some examples.

The computer program instructions may be provided to produce a machine, such that the instructions, which execute via a processor of a computer and/or other programmable data processing apparatus, create means for implementing the functions/acts specified in the block diagrams and/or flowchart block or blocks of the present disclosure.

As already mentioned, the above-mentioned computer program instructions may be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks of the present disclosure.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks of the present disclosure.

As used herein, the term "memory" may refer to a hard disk, a magnetic storage medium, a portable computer diskette or disc, flash memory, random access memory (RAM) or the like. Furthermore, the memory may be an internal register memory of a processor.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

When using the word "comprise" or "comprising" it shall be interpreted as non-limiting, i.e. meaning "consist at least of".

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a wireless device, for managing reporting of channel quality, the wireless device being configured to communicate with a mobile radio communication network, the method comprising:
    the wireless device being configured to transmit at least X number of channel quality reports within a certain amount of time, X being greater than or equal to 1;
    the wireless device identifying there being no downlink activity between the wireless device and the mobile radio communication network;

the wireless device starting an inactivity timer when there is no downlink activity between the wireless device and the mobile radio communication network;
the wireless device detecting the expiration of the inactivity timer; and
the wireless device reducing the channel quality reporting in response to detecting the expiration of the inactivity timer such that the wireless device is configured to transmit not more than Y number of channel quality reports within said certain amount of time, wherein Y is less than X, thereby reducing the channel quality reporting in response to detecting the expiration of the inactivity timer.

2. The method as claimed in claim 1, wherein the method further comprises:
receipt, by the wireless device, of an instruction from the mobile radio communication network, which instruction instructs the wireless device to return to the normal channel quality reporting, and
the wireless device increasing the channel quality reporting in response to receipt of the instruction such that the wireless device one again is configured to transmit at least X number of channel quality reports within the certain amount of time.

3. The method as claimed in claim 1, wherein the reduction of the level of channel quality reporting is further in response to identification of an uplink coverage limited scenario.

4. The method as claimed in claim 1, wherein the reduction of the level of channel quality reporting is further in response to identification of a multi Radio Access Bearer for speech and data.

5. A computer program product comprising a non-transitory computer readable medium storing a computer program for implementing the method of claim 1.

6. The method of claim 1, further comprising
receiving at the wireless device a power headroom threshold;
the wireless device measuring a power headroom; and
the wireless device determining that the measured power headroom is less than the received power headroom threshold, wherein
the wireless device reduces the channel quality reporting as a consequence of the wireless device: i) determining that the measured power headroom is less than the received power headroom threshold and ii) detecting the expiration of the inactivity timer.

7. The method as claimed in claim 1, further comprising:
after the wireless device reduces the channel quality reporting, the wireless device detecting downlink activity from the radio communication network to the wireless device, and
the wireless device increasing the channel quality reporting in response to detecting the downlink activity such that the wireless device one again is configured to transmit at least X number of channel quality reports within the certain amount of time.

8. A method, performed by a wireless device, for managing reporting of channel quality, the wireless device being configured to communicate with a mobile radio communication network, the method comprising:
the wireless device identifying there being no downlink activity between the wireless device and the mobile radio communication network,
the wireless device reducing, in response to the identification, a level of channel quality reporting when there is no downlink activity,
receiving a power headroom threshold from the mobile radio communication network, and
measuring a power headroom, the power headroom indicting a fraction of power available after subtracting power of a dedicated physical control channel from total power of the wireless device, wherein
the channel quality reporting is reduced by the wireless device in response to i) the wireless device identifying that there is no downlink activity between the wireless device and the mobile radio communication network and ii) the wireless device determining that the measured power headroom is below the received power headroom threshold.

9. A method, performed by a mobile radio communication network, for managing reporting of channel quality of a wireless device, the method comprising:
sending, to the wireless device, a configuration for configuring the wireless device to:
transmit at least X number of channel quality reports within a certain amount of time, X being greater than or equal to 1;
identify when there is no downlink activity between the wireless device and the mobile radio communication network,
start an inactivity timer when there is no downlink activity between the wireless device and the mobile radio communication network, and
reduce the channel quality reporting in response to expiration of the inactivity timer and there has been no downlink activity between the wireless device and the mobile radio communication network since the inactivity timer started such that the wireless device is configured to transmit not more than Y number of channel quality reports within said certain amount of time, wherein Y is less than X, thereby reducing the channel quality reporting in response to detecting the expiration of the inactivity timer.

10. The method as claimed in claim 9, wherein the method further comprises:
sending a power headroom threshold to the wireless device,
and the configuration is further for configuring the wireless device to:
measure a power headroom, the power headroom indicting a fraction of power available after subtracting power of a dedicated physical control channel from total power of the wireless device,
wherein the reduction of the level of channel quality reporting is further in response to identification that the measured power headroom drops below the received power headroom threshold.

11. The method as claimed in claim 9, wherein the method further comprises:
sending, to the wireless device, an instruction instructing the wireless device to return to a normal channel quality reporting from the reduced level of channel quality reporting,
and the configuration is further for configuring the wireless device to:
in response to receipt of said sent instruction, return to the normal channel quality reporting from the reduced level of channel quality reporting.

12. The method as claimed in claim 9, wherein the configuration is further for configuring the wireless device to:

return to a normal channel quality reporting from the reduced level of channel quality reporting in response to that the no downlink activity is no longer to be identified.

13. The method as claimed in claim 9, wherein the reduction of the level of channel quality reporting is further in response to identification of an uplink coverage limited scenario.

14. The method as claimed in claim 9, wherein the reduction of the level of channel quality reporting is further in response to identification of a multi Radio Access Bearer for speech and data.

15. A computer program product comprising a non-transitory computer-readable medium storing a computer program for implementing the method of claim 9.

16. A wireless device for managing reporting of channel quality, the wireless device being configured to communicate with a mobile radio communication network, the wireless device comprising:
a receiver;
a transmitter; and
a processor configured to:
employ the transmitter to transmit at least X number of channel quality reports within a certain amount of time, X being greater than or equal to 1;
identify there being no downlink activity between the wireless device and the mobile radio communication network;
start an inactivity timer when there is no downlink activity between the wireless device and the mobile radio communication network, and
reduce the channel quality reporting in response to expiration of the inactivity timer when there has been no downlink activity between the wireless device and the mobile radio communication network since the inactivity timer was started such that the wireless device is configured to transmit not more than Y number of channel quality reports within said certain amount of time, wherein Y is less than X, thereby reducing the channel quality reporting in response to detecting the expiration of the inactivity timer.

17. The wireless device as claimed in claim 16, wherein the processor is further configured to:
receive a power headroom threshold from the mobile radio communication network,
measure a power headroom, the power headroom indicting a fraction of power available after subtracting power of a dedicated physical control channel from total power of the wireless device,
wherein the reduction of the level of channel quality reporting is further in response to identification that the measured power headroom drops below the received power headroom threshold.

18. The wireless device as claimed in claim 16, wherein the processor is further configured to:
return to a normal channel quality reporting from the reduced level of channel quality reporting, wherein the return is in response to:
receipt, by the wireless device, of an instruction from the mobile radio communication network, which instruction instructs the wireless device to return to the normal channel quality reporting, and/or
that said no downlink activity is no longer to be identified.

19. The wireless device as claimed in claim 16, wherein the reduction of the level of channel quality reporting is further in response to identification of an uplink coverage limited scenario.

20. The wireless device as claimed in claim 16, wherein the reduction of the level of channel quality reporting is further in response to identification of a multi Radio Access Bearer for speech and data.

21. A mobile radio communication network, for managing reporting of channel quality of a wireless device, the mobile radio communication network comprising:
a receiver;
a transmitter; and
a processor configured to:
transmit at least X number of channel quality reports within a certain amount of time, X being greater than or equal to 1;
send, to the wireless device, a configuration for configuring the wireless device to:
identify when there is no downlink activity between the wireless device and the mobile radio communication network,
start an inactivity timer when there is no downlink activity between the wireless device and the mobile radio communication network, and
reduce the channel quality reporting in response to expiration of the inactivity timer when there has been no downlink activity between the wireless device and the mobile radio communication network since the inactivity timer was started such that the wireless device is configured to transmit not more than Y number of channel quality reports within said certain amount of time, wherein Y is less than X, thereby reducing the channel quality reporting in response to detecting the expiration of the inactivity timer.

22. The mobile radio communication network as claimed in claim 21, wherein the mobile radio communication network is further configured to:
send a power headroom threshold to the wireless device, and the configuration is further for configuring the wireless device to:
measure a power headroom, the power headroom indicting a fraction of power available after subtracting power of a dedicated physical control channel from total power of the wireless device,
wherein the reduction of the level of channel quality reporting is further in response to identification that the measured power headroom drops below the received power headroom threshold.

23. The mobile radio communication network as claimed in claim 21, wherein the mobile radio communication network is further configured to:
send, to the wireless device, an instruction instructing the wireless device to return to a normal channel quality reporting from the reduced level of channel quality reporting,
and the configuration is further for configuring the wireless device to:
in response to receipt of said sent instruction, return to the normal channel quality reporting from the reduced level of channel quality reporting.

24. The mobile radio communication network as claimed in claim 21, wherein the configuration is further for configuring the wireless device to:
return to a normal channel quality reporting from the reduced level of channel quality reporting in response to that said no downlink activity is no longer to be identified.

25. The mobile radio communication network as claimed in claim 21, wherein the reduction of the level of channel quality reporting is further in response to identification of an uplink coverage limited scenario.

26. The mobile radio communication network as claimed in claim 21, wherein the reduction of the level of channel quality reporting is further in response to identification of a multi Radio Access Bearer for speech and data.

* * * * *